United States Patent
Muenzenberger

(10) Patent No.: US 10,427,337 B2
(45) Date of Patent: Oct. 1, 2019

(54) METHOD AND INJECTION MOLDING SYSTEM FOR PRODUCING INTUMESCENT REACTION PLASTIC MOLDED PARTS AND REACTION PLASTIC MOLDED PART

(71) Applicant: Hilti Aktiengesellschaft, Schaan (LI)

(72) Inventor: Herbert Muenzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 94 days.

(21) Appl. No.: 14/902,115

(22) PCT Filed: Jul. 3, 2014

(86) PCT No.: PCT/EP2014/064142
§ 371 (c)(1),
(2) Date: Dec. 30, 2015

(87) PCT Pub. No.: WO2015/001001
PCT Pub. Date: Jan. 8, 2015

(65) Prior Publication Data
US 2016/0332345 A1    Nov. 17, 2016

(30) Foreign Application Priority Data
Jul. 3, 2013   (EP) ..................................... 13174879

(51) Int. Cl.
*B29C 44/34*     (2006.01)
*B29B 7/74*      (2006.01)
(Continued)

(52) U.S. Cl.
CPC ........ *B29C 44/3442* (2013.01); *B29B 7/7404* (2013.01); *B29B 7/7615* (2013.01);
(Continued)

(58) Field of Classification Search
CPC . B29B 7/7404; B29B 7/7615; B29C 66/7465; B29C 66/72326; B29C 45/14434
See application file for complete search history.

(56) References Cited

U.S. PATENT DOCUMENTS 3,495,710 A * 2/1970 Egorenkov ................ B01J 8/16
                                                    209/368
3,562,197 A   2/1971 Sears et al.
(Continued)

FOREIGN PATENT DOCUMENTS

DE    30 25 309 A1    2/1982
DE    30 41 731 A1    6/1982
(Continued)

OTHER PUBLICATIONS

Desai, A., Auad, M.L., Shen, H. and Nutt, S.R., 2008. Mechanical behavior of hybrid composite phenolic foam. Journal of cellular plastics, 44(1), pp. 15-36. (Year: 2008).*
(Continued)

*Primary Examiner* — Robert C Dye
*Assistant Examiner* — Nicholas R Krasnow
(74) *Attorney, Agent, or Firm* — Crowell & Moring LLP

(57) ABSTRACT

A method for producing an intumescent plastic molded part that consists of a reaction plastic which contains intumescent additives and glass fibers is disclosed. The method includes providing an additive mixture which is composed of the intumescent additives and the glass fibers and mixing the additive mixture and components of the reaction plastic, where a homogeneous mass is obtained. The homogeneous mass is introduced into an injection mold and the homogeneous mass is hardened in the injection mold. A injection molding system for producing the intumescent plastic molded part and an intumescent plastic molded part are also disclosed.

5 Claims, 1 Drawing Sheet

(51) Int. Cl.
  *B29B 7/76* (2006.01)
  *B29B 7/90* (2006.01)
  *B29C 67/24* (2006.01)
  *B29C 44/12* (2006.01)
  *B29C 44/02* (2006.01)
  B29K 509/08 (2006.01)
  B29K 105/04 (2006.01)
  B29K 105/16 (2006.01)
  B29B 11/08 (2006.01)
  B29K 105/00 (2006.01)
  B29K 105/12 (2006.01)
  B29K 309/08 (2006.01)

(52) U.S. Cl.
  CPC .............. *B29B 7/90* (2013.01); *B29C 44/02* (2013.01); *B29C 44/12* (2013.01); *B29C 67/246* (2013.01); *B29B 11/08* (2013.01); B29B 2911/14986 (2013.01); B29K 2105/0026 (2013.01); B29K 2105/04 (2013.01); B29K 2105/046 (2013.01); B29K 2105/12 (2013.01); B29K 2105/165 (2013.01); B29K 2309/08 (2013.01); B29K 2509/08 (2013.01); B29K 2995/0015 (2013.01); B29K 2995/0016 (2013.01)

(56) References Cited

U.S. PATENT DOCUMENTS

| | | | |
|---|---|---|---|
| 3,671,487 A * | 6/1972 | Abolins | C08K 5/03 106/18.13 |
| 3,969,291 A | 7/1976 | Fukuba et al. | |
| 4,037,011 A * | 7/1977 | Hattori | B29B 9/14 264/261 |
| 4,073,840 A * | 2/1978 | Saidla | B29B 7/905 264/45.3 |
| 4,157,326 A * | 6/1979 | Baer | B29B 9/14 428/361 |
| 4,278,769 A * | 7/1981 | Gebauer | C08J 3/226 521/90 |
| 4,307,062 A | 12/1981 | Wingard | |
| 4,307,226 A | 12/1981 | Bolon et al. | |
| 4,338,412 A | 7/1982 | von Bonin | |
| 4,367,295 A | 1/1983 | von Bonin | |
| 4,442,157 A | 4/1984 | Marx et al. | |
| 4,614,439 A * | 9/1986 | Brunt | B28C 5/40 366/154.2 |
| 4,857,364 A | 8/1989 | von Bonin | |
| 4,886,701 A * | 12/1989 | Ehnert | D04H 1/4218 442/320 |
| 5,430,076 A * | 7/1995 | Matsumoto | C08K 9/08 523/205 |
| 5,464,585 A | 11/1995 | Fitzgibbon | |
| 5,834,535 A * | 11/1998 | Abu-Isa | C08L 23/06 521/106 |
| 6,301,935 B1 * | 10/2001 | Audenaert | C03B 37/14 241/17 |
| 2003/0158314 A1 * | 8/2003 | Abu-Isa | C08K 5/0008 524/409 |
| 2004/0171731 A1 * | 9/2004 | Overholt | C08K 3/22 524/436 |
| 2004/0195729 A1 | 10/2004 | Howell et al. | |
| 2004/0266294 A1 * | 12/2004 | Rowen | D06M 11/78 442/149 |
| 2004/0266916 A1 * | 12/2004 | Harashina | C08K 3/016 523/217 |
| 2005/0009965 A1 * | 1/2005 | Schell | C08L 67/025 524/115 |
| 2006/0226568 A1 | 10/2006 | James et al. | |
| 2007/0129452 A1 * | 6/2007 | Clatty | C08G 18/4018 521/99 |
| 2010/0137508 A1 | 6/2010 | Corti | |
| 2010/0227957 A1 * | 9/2010 | Fujii | C08L 77/00 524/126 |
| 2011/0288226 A1 * | 11/2011 | Mehta | C08L 83/04 524/506 |
| 2013/0317148 A1 * | 11/2013 | Zheng | C08K 3/22 524/116 |
| 2014/0050815 A1 * | 2/2014 | Chern | C08L 69/00 425/542 |
| 2014/0246807 A1 * | 9/2014 | Baroux | C03C 25/10 264/258 |
| 2014/0275367 A1 * | 9/2014 | Kang | C08L 77/06 524/133 |
| 2015/0284638 A1 * | 10/2015 | Xu | E04B 1/80 428/317.9 |
| 2016/0024301 A1 * | 1/2016 | Hayashida | C08J 5/043 523/452 |

FOREIGN PATENT DOCUMENTS

| | | |
|---|---|---|
| DE | 33 02 416 A1 | 7/1984 |
| DE | 34 11 327 A1 | 10/1985 |
| DE | 196 53 503 A1 | 6/1998 |
| EP | 0 043 952 B1 | 1/1982 |
| EP | 0 051 106 B1 | 5/1982 |
| EP | 0 061 024 B1 | 9/1982 |
| EP | 0 116 846 B1 | 8/1984 |
| EP | 0 138 546 A2 | 4/1985 |
| EP | 0 139 401 A1 | 5/1985 |
| EP | 0 158 165 E1 | 10/1985 |
| EP | 0 274 068 A2 | 7/1988 |
| EP | 1 225 018 A2 | 7/2002 |
| EP | 1 347 549 A1 | 9/2003 |
| EP | 1 489 136 A1 | 12/2004 |
| EP | 1 641 895 B1 | 4/2006 |
| EP | 1 658 957 A1 | 5/2006 |
| GB | 755551 A | 8/1956 |
| GB | 2 007 689 A | 5/1979 |

OTHER PUBLICATIONS

PCT/EP2014/064142, International Search Report (PCT/ISA/210) dated Aug. 5, 2014, with partial English translation, enclosing Written Opinion of the International Searching Authority (PCT/ISA/237) (Fourteen (14) pages).

Levchik et al., "Thermal decomposition, combustion and flame-retardancy of epoxy resins—a review of the recent literature", *Polym Int* 53: 1901-1929 (2004).

* cited by examiner

METHOD AND INJECTION MOLDING SYSTEM FOR PRODUCING INTUMESCENT REACTION PLASTIC MOLDED PARTS AND REACTION PLASTIC MOLDED PART

This application claims the priority of International Application No. PCT/EP2014/064142, filed Jul. 3, 2014, and European Patent Document No. 13174879.0, filed Jul. 3, 2013, the disclosures of which are expressly incorporated by reference herein.

BACKGROUND AND SUMMARY OF THE INVENTION

The invention relates to a method as well as an injection molding system for producing intumescent reaction plastic molded parts, which consist of a plastic, and which contain an additive mixture of intumescent fillers and glass fibers. The invention also relates to an intumescent plastic molded part.

Such reaction plastic molded parts (hereinafter also referred to as "molded part" for short) consist of a reaction plastic, particularly a foam plastic, which depending on the intended use of the molded part may contain aggregates, such as additives and/or fillers. The plastic (polymer) is also referred to as a binder and can be obtained from the reaction of at least two reactive compounds that are blended into a reactive mixture. The reaction essentially occurs solely by combining the components, without additional external energy input, such as heat. The molded part may contain other supplements, such as additives and auxiliary materials, wherein these are added to the reactive mixture during production. "Additives" in the sense of the invention are thereby additive agents that are added to a substance mixture to achieve or improve certain properties, such as production, storage, processing or product properties during and after the usage phase. "Fillers" in the sense of the invention are additive agents that increase the volume of a substance mixture without changing the essential properties.

A common method for producing such molded parts is reaction injection molding (RIM). According to it, the components of the reactive mixture and any additional supplements are intensively blended in a mixer, such as a mixing head, and directly afterwards injected as a reaction mass into a forming mold. Hardening, i.e., the reaction of the components of the reactive mixture to the plastic (herein also referred to as polymer), and in the case of foam molded parts the foaming of the formed polymer, take place in the mold. The method is used preferably in the production of foam molded parts made of polyurethane.

To produce intumescent molded parts that, under intense heat such as in the event of a fire, increase their volume and thereby seal wall or ceiling breaches for example, a substance mixture is added that causes intumescence in the event of a fire. The substance mixture is added to the mixing head in addition to the reactive components of the binder. The substance mixture causes the softening and if applicable melting foam molded part, when under intense heat, to increase its volume or generate an inert gas by means of which the volume is increased. Below, the substance mixture is also referred to as additive mixture.

The molded parts, particularly long molded parts such as cord seals, are not very stable and easily break apart.

For larger fire protection elements, it is frequently noted that in the advanced burnup of the fire protection blocks, the already formed ash falls off, or the not yet burned part of the fire protection block falls out of the partition. This is attributed primarily to the fact that in the case of a fire, the matrix begins to melt, whereby this is when the intumescence of the additives can first take place. However, the zone of the liquid matrix does weaken the bond with the already formed ash crust. Furthermore, intumescence may contribute to the still unburned part of the fire protection block being pushed out of the partition. This can become problematic particularly for large ceiling partitions.

The weakening of the bond between the ash crust and the still unburned part of the fire protection block may become a problem in the hose-stream test specified in the US, in which the ash crust must withstand a strong water jet after the fire.

To improve the stability of the molded part per se and the molded body that has expanded under heat as well as the ash crust that has formed, it is known from prior art to add glass fiber to the intumescent molded parts. These stabilize the molded part prior to its use. In the case of fire, when the molded part decomposes and intumesces, the glass fibers reinforce the formed ash crust. In this way, the molded part can withstand increased water pressure for example as occurs when extinguishing a fire.

However, to achieve uniform stability of the molded part, it is necessary to distribute the glass fibers evenly in the molded part. In principle, the glass fibers can be macerated in one of the reactive components, such as the polyol component, during the production of polyurethane molded parts. However, since these components are continually recirculated in the blending and dosing systems, the pumps would wear out very quickly. For that reason, the glass fibers are not macerated in the reactive components and supplied to the blender.

The problem of the invention is to provide a method as well as an injection molding system that, in the production of the molded part, enable an even distribution of the glass fibers in the finished molded part. The object of the invention is also to provide such a molded part.

To solve the problem, a method for producing intumescent molded parts is provided that consists of a reaction plastic, particularly polyurethane, and which contain intumescent additives as well as glass fibers, wherein the method has the following steps:

Providing an additive mixture of the intumescent additives and glass fibers,

Blending the obtained additive mixture and the components of the polymer,

Introducing and hardening the mass of the components of the polymer and the additive mixture and If applicable, foaming the mass The first step thereby occurs separately from providing the components of the polymer. One obtains an additive mixture in which the glass fibers are homogeneously distributed in the intumescent additives. It may involve a mixture of all additives. Alternatively, the additives may also be divided among two or more individual mixtures, depending on the number of lines available in which the mixtures are conveyed.

The second step, the mixing of the additive mixture provided in step 1 with the components of the polymer, occurs in a multi-component blending and dosing system. A mass is obtained in which the additive mixture is distributed homogeneously in the components of the polymer. The components of the binder may hereby also consist of multiple individual components, which may be supplied separately to the mixing head, depending on the number of lines available in which the components are conveyed.

The invention is based on the idea of mixing the glass fibers evenly with the intumescent additives and to then blend this additive mixture with the components of the polymer. The glass fibers are very easily macerated and blended with the intumescent additives. After the blending process, the mixture can be easily stored without having to expect any separation processes. The pumps that deliver the components of the polymer thus do not come into contact with the hard glass fibers, so that these pumps are protected from premature wear. Since the additive mixture is subsequently blended with the components of the polymer, even distribution of the glass fibers in the molded part is ensured.

The intumescent additives are preferably on hand in a powdered form, and the glass fibers are macerated in the filler materials. This means an additive mixture is produced which inherently has an even distribution of fillers and glass fibers. In a powdered state, the intumescent fillers can be ideally mixed with the glass fibers so that a homogeneous and fluid additive mixture results.

Preferably, the fillers are fluidized before introducing the glass fibers, so that the fillers, even if these are on hand in a powdered form for example, have liquid or pasty properties. In this state, the glass fibers can be ideally distributed or macerated in the fillers.

To fluidize the fillers, a dissolver is used for example with which enables a particularly good blending of the additives and glass fibers. Ideally, glass fibers with a diameter of 4 to 10 μm and a length of 3 to 10 mm are used. These dimensions for the glass fibers have proven to be ideal for ensuring that the glass fibers can also reach small, narrow regions of an injection mold. In addition, the length of the glass fibers is sufficient to achieve the required stability of the foamed plastic molded part.

To achieve the desired intumescent properties and the required stability of the foam molded part, the mass or volume portion of the additive mixture amounts to between 0.5% and 5% relative to the plastic molded part. This portion of the additive mixture represents an ideal compromise between the foaming of the molded part and the stability of the molded part after foaming.

According to the invention, an injection molding system is also provided for producing intumescent plastic molded parts that consist of a plastic, which contains an additive mixture of intumescent additives and glass fibers. The injection molding system has a multicomponent blending and dosing system that has a mixing head with a mixing chamber. The mixing chamber has at least one inlet for the components of the polymer and an inlet for the additive mixture, as well as an outlet out of which the mass of the components of the polymer and the additive mixture can flow out of the mixing chamber. At the inlet for the additive mixture, there is provided a blending device for blending the additives with the glass fibers.

Preferably, the mixing head has two inlets for the components of the polymer so that these can flow separately from one another into the mixing chamber and can first blend in it, particularly together with the additive mixture, and subsequently react together. Alternatively, multiple inlets may be present, wherein the components of the polyurethane foam are divided among multiple individual components, particularly when multiple polyols are used, and/or the additional components (catalyst, blowing agent, stabilizer) are distributed among multiple additional vessels.

The multicomponent blending and dosing system may also have a dissolver for fluidizing the additives so that these have liquid or pasty properties prior to blending with the glass fibers, by means of which an ideal blending with the glass fibers as well as injection into the mixing chamber are possible.

According to the invention, there is also provided a plastic molded part, which consists of a polymer, particularly a reaction plastic such as polyurethane, that contains intumescent additives and glass fibers and if applicable additional additives and/or fillers, wherein the foam molded part is produced using a method according to the invention.

All polymers that one can produce in the reaction injection molding process are suitable for producing the foam molded parts. In particular, these pertain to reaction plastics, wherein these may be foamed or non-foamed. The foaming of plastics for producing foamed molded parts may occur either physically or chemically, wherein chemical foaming is preferred. This can result from the proper selection of reactants, or one can add conventional foaming agents (blowing agents), which are known to a person skilled in the art, to the reaction mixture.

For practical purposes, one uses for intumescent additives those that, under heat, form an expanded, insulating layer of a flame-resistant material, which protects the substrate from overheating and thereby prevents or at least delays mechanical or static properties of load-bearing components from changing. The formation of a voluminous, insulating layer, namely an ash layer, may be formed by the chemical reaction of a mixture of corresponding, inter-matched compounds that react with each other under heat. Such systems are known to persons skilled in the art under the term "chemical intumescence" and can be used according to the invention. Alternatively, the voluminous, insulating layer can be formed by the inflation of one single compound, which, without a chemical reaction taking place between two compounds, releases gases under heat. Such systems are known to persons skilled in the art under the term "physical intumescence" and can also be used according to the invention. Both systems may be used according to the invention alone or together in combination.

For designing an intumescent layer by means of chemical intumescence, three components are generally required—a carbon source, a dehydrogenation catalyst, and a blowing agent—which, in coatings for example, are contained in a binding agent. Under heat, the binding agent softens and the fire protection additives are released so that these can react with each other in the event of chemical intumescence, or expand in the case of physical intumescence. By means of thermal decomposition, one forms from the dehydrogenation catalyst the acid that serves as a catalyst for the carbonification of the carbon source. At the same time, the blowing agent decomposes thermally while forming inert gases, which causes an expansion of the carbonized (charred) material and if applicable the softened binding agent while forming a voluminous, insulating foam.

In an embodiment in which the insulating layer is formed by chemical intumescence, the intumescent additives comprise at least a carbon structure former to the extent the binding agent cannot be used as such, at least one acid former, at least one blowing agent, and at least one inorganic structure former. The components of the additive are in particular selected in such a manner that they can develop a synergy, wherein some of the compounds can fulfill multiple functions.

As a carbon source, one can consider the compounds typically used in intumescent flame retardant agents and known to persons skilled in the art, such as starch-like compounds, e.g., starches and modified starches, and/or multivalent alcohols (polyols), such as saccharides and polysaccharides and/or a thermoplastic or thermosetting polymer resin binding agent, such as a phenol resin, a urea resin, a polyurethane, polyvinylchloride, poly(meth)acrylate, polyvinyl acetate, polyvinyl alcohol, a silicon resin and/or a rubber. Suitable polyols are polyols from the sugar group, pentaerythritol, dipentaerythritol, tripentaerythritol, polyvinyl acetate, polyvinyl alcohol, sorbitol, and EO-PO-polyols. Preferred are pentaerythritol, dipentaerythritol, or polyvinyl acetate.

It should be mentioned that in case of fire, the binding agent itself may also have the function of a carbon source.

As dehydrogenation catalysts or acid producers, one can consider the compounds typically used in intumescent flame-retardant agents and known to persons skilled in the art, such as a salt or an ester of an inorganic, non-volatile acid, selected from sulfuric acid, phosphoric acid, or boric acid. Essentially, phosphor-containing compounds are used, whose range is very large as they extend across multiple oxidation stages of the phosphor, such as phosphines, phosphine oxides, phosphonium compounds, phosphates, elementary red phosphorus, phosphites and phosphates. As phosphoric acid compounds, one can mention: monoammonium phosphate, diammonium phosphate, ammonium phosphate, ammonium polyphosphate, melamine phosphate, melamine resin phosphate, potassium phosphate, polyol phosphates such as pentaerythrit phosphate, glycerin phosphate, sorbitol phosphate, mannitol phosphate, dulcet phosphate, neopentyl glycol phosphate, ethylene glycol phosphate, dipentaerythrit phosphate and similar. Preferably, a polyphosphate or an ammonium polyphosphate is used as a phosphoric acid compound. Melamine resin phosphates refer to compounds such as reaction products from lamelite c (melamine-formaldehyde resin) with phosphoric acid. As sulfuric acid compounds, one can mention for example: ammonium sulfate, ammonium sulfamate, nitroaniline bisulfate, 4-nitroaniline-2-sulfonic acid, and 4,4-dinitrosulfanilamide and similar. As a boric acid compound, one can mention melamine borate as an example.

As a blowing agent, one can consider the compounds typically used in flame retardant agents and known to persons skilled in the art, such as cyanuric acid or iocyanic acid and their derivatives, melamine, and its derivatives. These are cyanamide, dicyanamide, dicandiamide, guanidine and its salts, biguanide, melamine cyanurate, cyanic acid salts, cyanic acid esters and amides, hexamethoxymethyl melamine, dimelamine pyrophosphate, melamine polyphosphate, and melamine phosphate. Preferably, hexamethoxymethyl melamine or melamine (cyanuric acid amide) are used.

Also suited are components that do not limit their mode of action to a single function, such as melamine polyphosphate, which acts both as an acidifying agent as well as a blowing agent. Other examples are described in GB 2 007 689 A1, EP 139 401 A1 and U.S. Pat. No. 3,969,291 A1.

In one embodiment in which the insulating layer is formed by physical intumescence, the intumescent additives comprise barrier forming additives at least a thermally expandable compound, such as a graphite intercalation compound, which are also known as expandable graphite. These may also be included in the binding agent.

Expandable graphite may refer for example to known intercalation compounds of SOx, NOx, halogen and/or acids, particularly strong acids, such as acetic acid, saltpeter acid, or sulfuric acid, in graphite. These are referred to as graphite salts. Preferred are expandable graphites, that emit $SO_2$, $SO_3$, $NO$ and/or $NO_2$ at temperatures of 120 to 350° C. for example. Expandable graphite can for example be present in the form of platelets with a maximum diameter ranging from 0.1 to 5 mm. Preferably, this diameter lies in the range of 0.5 to 3 mm. Expandable graphites suitable for this invention are commercially available. Generally, expandable graphite particles are evenly distributed in the fire protection elements according to the invention. However, the concentration of expandable graphite particles may also be varied in a piecemeal, pattern-like, planar, or sandwich-like manner. In this regard, reference is made to EP 1489136 A1, whose content is hereby included in this application.

Since the ash crust formed in the event of fire is generally too unstable and, depending on its density and structure, can be dispersed by air currents for example, which has a negative effect on the insulating action of the coating, preferably at least one ash crust stabilizer is added to the just listed components.

As ash crust stabilizers or structure formers, one can consider the compounds used in flame retardant agents and known to persons skilled in the art, for example expandable graphite and particulate metals, such as aluminum, magnesium, iron, and zinc. The particulate metal may come in the form of a powder, platelets, flakes, fibers, threads and/or whiskers, wherein the particulate metal in the form of powder, platelets, or flakes has a particle size of ≤50 μm, preferably from 0.5 to 10 μm. If using particulate metal in the form of fibers, threads, and/or whiskers, a thickness of 0.5 to 10 μm and a length of 10 to 50 μm are preferred. As an ash crust stabilizer, one can alternatively or additionally use an oxide or a compound of a metal from the group comprising aluminum, magnesium, iron or zinc, particularly iron oxide, preferably iron trioxide, titanium dioxide, a borate, such as zinc borate and/or a glass frit out of low-melting point glasses with a melting temperature of preferably at or below 400° C., phosphate or sulfate glasses, melamine polyzinc sulfates, ferroglasses, or calcium borosilicates. Adding such an ash crust stabilizer contributes to a significant stabilization of the ash crust in the event of fire, since these additives increase the mechanical strength of the intumescent layer and/or prevent their dripping off. Examples of such additives can also be found in U.S. Pat. Nos. 4,442,157 A, 3,562,197 A, GB 755 551 A as well as EP 138 546 A1.

In addition, ash crust stabilizers such as melamine phosphate or melamine borate may also be contained.

Furthermore, the binding agent may contain as an ablative additive an inorganic compound that has water, e.g., as crystal water, firmly embedded in it and does not dry out at temperatures up to 100° C., but does release it in the event of fire starting at 120° C. In this way, temperature-conductive parts can be cooled. Preferred is an inorganic hydroxide or hydrate releasing water at the fire temperature or upon flame impingement, particularly aluminum hydroxide, aluminum oxide hydrate or a partially hydrated aluminum hydroxide. Also coming under consideration in regard to flame impingement are other water-releasing inorganic hydroxides or hydrates as described in EP 0 274 068 A2.

Such compounds that can be used as substance mixtures are known to persons skilled in the art and are disclosed in the following documents, which are hereby expressly referred to: DE 30 25 309 A1, DE 30 41 731 A1, DE 33 02 416 A1, DE 34 11 327 A1, EP 0 043 952 B1, EP 0 051 106 B1, EP 0 061 024 B1, EP 0 116 846 B1, EP 0 158 165 B1, EP 0 274 068 A2, EP 1 347 549 A1, EP 1 641 895 B1 and DE 196 53 503 A1.

Optionally, one or more reactive flame retardants may be added to the binding agent. Such compounds are built into the binding agent. An example in the sense of the invention are reactive organophosphorous compounds, such as 9,10-dihydro-9-oxa-10-phosphaphenanthrene-10-oxide (DOPO) and its derivatives and adducts. Such compounds are described for example in S. V. Levchik, E. D. Weil, *Polym. Int.* 2004, 53, 1901-1929.

Additional advantages and features are included in the description below in conjunction with the attached drawings.

DETAILED DESCRIPTION OF THE DRAWINGS

Figure 1:
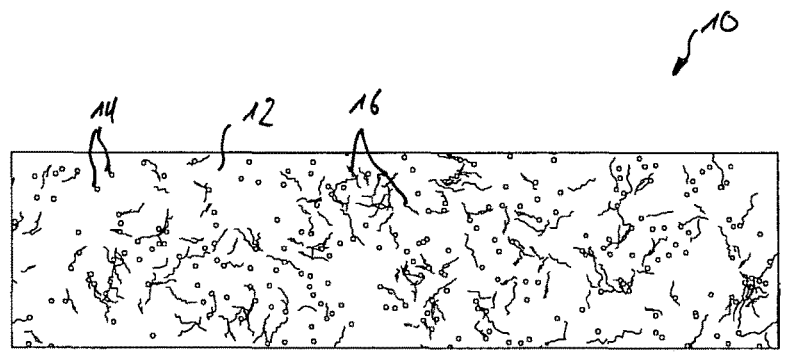
FIG. 1 depicts a molded part according to the invention.

FIG. 1 depicts a plastic molded part 10 that consists of a polyurethane foam 12, which has evenly distributed intumescent additives 14 and glass fibers 16. Plastic molded part 10 has an essentially rectangular cross-section. Depending on the installation conditions and the intended use, any other shapes of the plastic molded part are possible.

Such a plastic molded part 10 is used as a fire protection element, for example for wall or ceiling breaches. In the event of fire, intumescent additives 14 react with one another due to the increasing temperature and form a voluminous foam out of flame-retarding material so that the volume of plastic molded part 10 is increased. In the expanded state, plastic molded part 10 can seal the wall or ceiling breach and thereby prevent smoke or fire from spreading.

The purpose of glass fibers 16 is to stabilize plastic molded part 10, both in the assembled state shown in FIG. 1 as well as in the foamed stated, and to increase its strength. To simplify the production of such a plastic molded part 10, one uses, instead of glass fiber mats or directional glass fibers, non-directional glass fibers having a length of 3 to 10 mm and a diameter of 4 to 10 μm.

The dimensions of 3 to 10 mm and a diameter of 4 to 10 μm have proven to be ideal to ensure penetration of glass fibers 16 into small regions of an injection mold, even for more elaborate plastic molded parts. In addition, such glass fibers 16 offer sufficient stability of plastic molded part 10, without restricting its expansion properties in the event of fire. Since glass fibers 16 are present in a non-directional manner, uniform high stability is also created in all space directions. In addition, the complex orientation of the glass fiber mats is no longer necessary.

Figure 2:
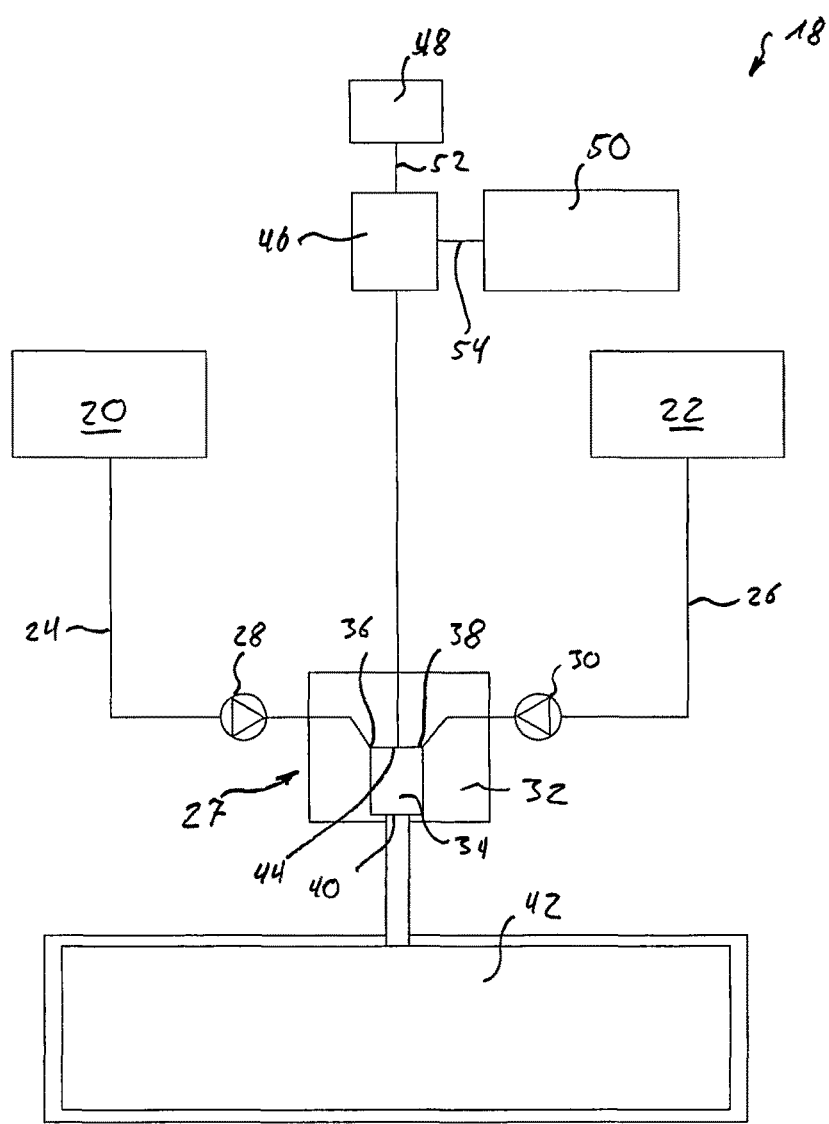
FIG. 2 depicts an injection molding system according to the invention for producing the molded part from FIG. 1.

FIG. 2 depicts an injection molding system 18 for producing such an intumescent plastic molded part 10.

Injection molding system 18 has two storage tanks 20, 22 in which the components of the polyurethane foam (isocyanate, polyol) are stored separate from each other. Alternatively, there may be multiple storage tanks, wherein the components of the polyurethane foam are divided among multiple tanks, particularly when multiple polyols are used, and/or the additional components (catalyst, blowing agent, stabilizer, intumescent additives) are divided among multiple other tanks. In addition, lines 24, 26 are provided that lead from one of the storage tanks 20, 22 to a multicomponent and dosing system 27. Every line 24, 26 has a pump 28, 30 to deliver the respective base material from storage tank 20, 22 to multicomponent and dosing system 27.

Multicomponent and dosing system 27 has a mixing head 32 with a mixing chamber 34. For each of the components, mixing chamber 34 has an inlet 36, 38, each of which can be connected to one of the lines 24, 26 to feed the components into mixing chamber 34.

From the mixing chamber, an outlet 40 leads to an injection mold 42 that reproduces plastic molded part 10.

To produce a conventional plastic molded part out of a polyurethane foam, the components of the polyurethane foam (isocyanate and polyol) are fed from storage tanks 20, 22 via lines 24, 26 to mixing head 32, blended in mixing chamber 34, and sprayed into injection mold 42, in which the mass foams and hardens. Injection mold 42 can thereby be designed as closed or open, wherein in the open design, the mold is sealed with a cover.

In addition, mixing chamber 34 of injection molding system 18 according to the invention has an additional inlet 44 for an additive mixture of intumescent additives 14 and glass fibers 16. Alternatively, there may also be two inlets for additive mixtures, such as for separate dosing of the additives. The glass fibers can hereby be contained in only one additive inflow or in both additive inflows. As explained below, the additive mixture is produced out of glass fibers 16 and additives 14 in a mixing device 46.

Mixing device 46 has a first reservoir 48 for intumescent additive 14 as well as a second reservoir 50 for glass fibers 16. Intumescent additives 14 as well as glass fibers 16 may be supplied from reservoirs 48, 50 via lines 53, 54 to mixing device 46, such as by being conveyed pneumatically. A pump or a dosing device may also be integrated in the mixing device for the additives. The glass fibers are thereby not conveyed via the pumps.

In mixing device 46, glass fibers 16 are blended with intumescent additives 14 or macerated in it, and then fed via inlet 44 into mixing chamber 34.

To achieve good blending of these substances, intumescent additives 14 are fluidized before introducing glass fibers 16, i.e., these are prepared in such a manner that they have fluid or pasty properties, in other words, they behave like a liquid. With the intumescent fillers in this state, an ideal blending with glass fibers 16 is possible. To fluidize intumescent additives 14, mixing device 46 has a dissolver for example.

After fluidizing intumescent additives 14, glass fibers 16 are introduced into mixing device 46, wherein these combine with intumescent additives 14 into an additive mixture, whereby glass fibers 16 are evenly distributed.

Subsequently, this additive mixture in multicomponent blending and dosing system 27 is fed via inlet 44 into mixing chamber 34 and blended in it with the components of the polyurethane foam (isocyanate, polyol), which are supplied via inlets 36, 38 into mixing chamber 34. After the additive mixture has blended with the components, this mass is introduced via outlet 40 into injection mold 42, foams up in it, and hardens.

This manufacturing process has the advantage that it results in very little wear to injection molding system 18. Blending glass fibers 16 with the components of the polyurethane foam prior to introducing it into multicomponent and dosing system 27 would result in a rapid wear of pumps 28, 30 due to the hard glass fibers.

For this reason, glass fibers 16 are introduced via a separate inlet 44 together with intumescent additives 14 into mixing chamber 34 so that pumps 28, 30 of lines 24, 26 do not come into contact with glass fibers 16 and are therefore not subject to increased wear.

To achieve ideal fire protection, in other words to achieve the desired foaming properties in the event of fire, the mass or volume share of the additive mixture amounts to between 0.5 and 5% relative to the plastic molded part.

In the embodiment depicted here, mixing head 32 has two inlets 36, 38 for the components of polyurethane foam 12. However, it is also conceivable that only one inlet is provided and the components of the polyurethane foam are mixed directly before being introduced into mixing head 32. Alternatively, more than two inlets are also possible, so that the individual components can be separated once again.

The invention claimed is:

1. A method for producing an intumescent plastic molded part that consists of a reaction plastic which contains intumescent additives and glass fibers, comprising the steps of:
    introducing the glass fibers into the intumescent additives in a mixing device and mixing the glass fibers evenly through the intumescent additives in the mixing device to form an additive mixture;
    introducing components of the reaction plastic by a pump into a mixing chamber through a first inlet of the mixing chamber;
    introducing the additive mixture from the mixing device into the mixing chamber through a second inlet of the mixing chamber;
    flowing a mass of the components of the reaction plastic and the additive mixture out of the mixing chamber through an outlet of the mixing chamber and into an injection mold; and
    hardening the mass in the injection mold.

2. The method according to claim 1, wherein the glass fibers have a diameter of 4 µm to 10 µm and a length of 3 mm to 10 mm.

3. The method according to claim 1, wherein a mass or a volume share of the additive mixture amounts to between 0.5% and 5% relative to the intumescent plastic molded part.

4. The method according to claim 1, wherein the produced intumescent plastic molded part is a foamed plastic molded part.

5. The method according to claim 1, further comprising the step of foaming the mass in the injection mold.

* * * * *